Patented Mar. 28, 1944

2,345,098

UNITED STATES PATENT OFFICE 2,345,098

PROCESS OF SAPONIFYING VITAMIN-CONTAINING FATTY MATERIAL

Loran O. Buxton, Belleville, N. J., assignor to National Oil Products Company, Harrison, N. J., a corporation of New Jersey No Drawing. Application July 26, 1941,
Serial No. 404,156

11 Claims. (Cl. 167—81)

This invention relates to improvements in the refinement of edible fatty materials, and more particularly to the production of high potency fat-soluble vitamin oils and concentrates having improved taste and odor.

It is common practice in the concentration of vitamin-bearing fatty materials to subject such materials to the action of alkalis to saponify and remove all or part of the fatty substances and thus concentrate the vitamin principles in the unsaponified residue. Such vitamin-bearing materials, notably the fish liver oils, contain substances of undesirable taste and odor, and alkali treatments tend to develop, concentrate and fix these substances in the vitamin-bearing matter in forms very difficult to remove by subsequent treatments.

It has heretofore been discovered, as disclosed and claimed in my copending applications, Serial Nos. 315,926 and 317,685, filed January 27, 1940, and February 7, 1940, respectively, and which have now matured into Patent Nos. 2,258,671 and 2,258,673, respectively, that undesirable tastes and odors can be removed from edible fatty materials by contacting such materials with edible gums, sugars, and the like, at temperatures between 100° C. and 200° C. While these processes have proved highly efficacious this operation constitutes an extra step in the refining process and involves application of heat to the sensitive vitamin materials.

Accordingly, it is an object of this invention to minimize the tendency of alkalis to develop, concentrate and fix substances of undesirable taste and odor in the unsaponified portions of fatty materials treated therewith.

A further object is to provide an improved process for removing substances of undesirable taste and odor from fatty materials.

A still further object is to prevent the development of undesirable taste and odor in fatty materials during alkali treatment thereof.

The invention accordingly comprises the several steps and the relation of one or more of such steps with respect to each of the others thereof, which will be exemplified in the process hereinafter disclosed, and the scope of the invention will be indicated in the claims.

The above and other objects are achieved in accordance with this invention by mixing a small quantity of a fixative material, selected from the group consisting of sugars, sugar derivatives and edible gums, into a fatty material which is being treated, or one which is to be treated, with alkali. The unsaponified portion of the fatty material when separated from the soap and fixative material after the saponification is substantially devoid of the usual characteristic "concentrate" odor and taste, the substances producing odor and taste having been taken up by the fixative material and the further development of these substances prevented thereby. The saponification may be carried out at room or only slightly elevated temperature in accordance with the usual practice in alkali treatment of fatty materials.

Any fat-soluble vitamin or provitamin-containing material having an undesirable taste and odor, or one which develops undesirable taste and odor when treated with alkali, may be treated in accordance with this invention; thus the process of this invention may be applied to materials containing vitamins A, D, E or K, such as, for example, cod liver oil, halibut liver oil, sword fish liver oil, tuna liver oil, shark liver oil, whale liver oil, porpoise liver oil, seal liver oil, sardine oil, wheat germ oil, palm oil and similar oils. The process of this invention is particularly applicable to the concentration of vitamin A and/or D containing oils of fish origin, since treatment of such materials in accordance with my invention produces products far superior to any of those now on the market. Further, this process can also be applied to non-vitamin oils that are to be saponified for the recovery of the unsaponifiable material.

As an odor and taste fixative substance for the process of this invention there may be employed a substance selected from the group consisting of sugars, sugar derivatives and edible gums. Specific examples of substances falling within this group include, among others, arabinose, pectin, lactose, gelactose, maltose, fructose, levulose, sorbitol, mannitol, sucrose, glucose, dextrose, xylose and the like; the esters, ketones and like derivatives of the sugars; any edible gum such as, for example, gum tragacanth, gum arabic, gum guaiac, gum mastic, and other gums well known in the art; or any edible commercial substance containing one or more of the above materials, such as, molasses, corn syrup, malt syrups, honey and pomace. In practice it has been found that the best results are obtained when a sugar or sugar-containing fixative is used, particularly blackstrap molasses, honey and sorbitol.

It is advantageous to completely deaerate the fixative material before employing it in the practice of this invention in order to minimize oxidation of the vitamins; this deaeration may be carried out by forming an aqueous slurry of the material, and warming the slurry while bubbling an inert gas therethrough with thorough agitation until the slurry is completely deaerated. This deaerated slurry may be employed directly in the practice of my invention. Other methods of deaeration may be employed.

In carrying out the process of my invention, a fat-soluble vitamin-containing oil is mixed with a suitable amount of the fixative material of the type described, and the mixture subjected to treatment with alkali. The amount of fixative material used may vary widely, depending to some extent upon the odor and taste of, or latent in, the vitamin-containing oil to be treated; generally, however, an amount between about 1% and about 20% of the weight of the vitamin-containing oil is suitable.

The manipulative details of the saponification procedure per se do not constitute a part of this invention; thus any usual alkali refinement procedure or vitamin concentration process may be used. It is preferable, however, that the procedures disclosed in the pending applications of Buxton and Colman Serial No. 350,166, filed August 21, 1940, now U. S. Patent No. 2,318,749, and Buxton and Simons, Serial No. 333,114, filed May 3, 1940, now U. S. Patent No. 2,318,748, be employed in the preparation of the unsaponifiable fraction of fish liver oils. In accordance with the present invention, the fixative material is admixed with the oil prior to or during the alkali addition in the aforementioned processes. The amount of caustic used may vary, but will usually be between about 25% and about 125% of the amount required to completely saponify the saponifiable material in the oil. In the production of the unsaponifiable fraction of an oil all the fat should be reacted with alkali. However, where it is desired to merely produce a so-called high potency oil, only a portion of the fat will be removed by saponification.

The process of my invention may be used in conjunction with other refinement procedures which may precede or follow the present process as far as sequence is concerned. For instance the oil subjected to the present process may be pretreated by the process disclosed in my copending application, Serial No. 315,926, filed January 27, 1940, or by the process disclosed in my co-pending application, Serial No. 227,599, filed August 30, 1938, now U. S. Patent No. 2,306,776.

The refined products of my invention possess very little, if any, of the tastes and odors characteristic of the material from which they are obtained; hence, these products are eminently suitable for a variety of purposes and find particular application in the preparation of vitamin products for human consumption. Further, these products do not have the characteristic bitter "concentrate" taste usually developed during the alkali concentration of vitamin oils.

The exact mechanism whereby the fixative materials remove the objectionable taste and odor is not known; it is believed, however, that the hydroxyl group in the sugars are converted into aldehyde, carboxyl and keto groups upon contact with the alkali, which groups, in turn, react with the bad-tasting and odoriferous substances in the oil during the saponification step and thus carry them out of the oily phase of the saponification mass. However, the invention is not dependent upon the foregoing or any other particular theory of operation.

For a fuller understanding of the nature and objects of the invention, reference should be had to the following examples which are given merely to further illustrate the invention and are not to be construed in a limiting sense, all parts given being by weight.

Example I 200 parts of crude shark liver oil, 100 parts of ethylene dichloride, 6 parts of isopropanol and 7 parts of blackstrap molasses were admixed in an insulated kettle. The mass was agitated while introducing nitrogen gas into the mass from a point at the bottom of the kettle. After the mass had been stirred sufficiently to effect homogeneity throughout, agitation was continued while adding an aqueous 45% KOH solution (15% excess over the amount theoretically required to completely saponify all the saponifiable matter in the oil) at 40° C. to 60° C. Agitation of the mass was continued until a heavy super-solvented emulsion was formed which did not break or bleed when stirring was discontinued. The mass was allowed to stand overnight in the heat-insulated kettle. The mass was heated to a temperature of 60° C. to 80° C. while gently agitating for a period of one hour until the soap changed from a super-solvented paste-like mass to separate and individual granular, fluffy and feathery particles. 500 parts of ethylene dichloride were added with stirring and the mass cooled to room temperature, whereupon the soap particles floated to the top of the liquid. The liquid layer was drawn off and the solvent removed therefrom by distillation under reduced pressure. The soap was washed again with fresh solvent to remove the adsorbed unsaponifiables thereon, and the solvent removed as before. The resultant unsaponifiable fraction was completely devoid of undesirable characteristic bitter taste and odor.

Example II 200 parts of crude shark liver oil, 100 parts of ethylene dichloride, 6 parts of isopropanol and 6 parts of commercial sorbitol were admixed in an insulated kettle. The mass was agitated while introducing nitrogen gas into the mass from a point at the bottom of the kettle. After the mass had been stirred sufficiently to effect homogeneity throughout, agitation was continued while adding an aqueous 45% KOH solution (15% excess over the amount theoretically required to saponify all the saponifiable matter in the oil) at 40° C. to 60° C. Agitation of the mass was continued until a heavy super-solvented emulsion was formed which did not break or bleed when stirring was discontinued. The mass was allowed to stand overnight in the heat-insulated kettle. The mass was heated to a temperature of 60° C. to 80° C. while gently agitating for a period of one hour until the soap changed from a super-solvented paste-like mass to separate and individual granular, fluffy and feathery particles. 500 parts of ethylene dichloride were added with stirring and the mass cooled to room temperature, whereupon the soap particles floated to the top of the liquid. The liquid layer was drawn off and the solvent removed therefrom by distillation under reduced pressure. The soap was washed again with fresh solvent to remove the adsorbed unsaponifiables thereon, and the solvent removed as before. The resultant concentrate was completely devoid of undesirable fishy taste and odor and of any characteristic bitter "concentrate" taste.

Example III 20 parts of "Nuchar XXX" (a commercially obtainable adsorptive carbon) and 1800 parts of ethylene dichloride were admixed in an open vessel. The mass was moderately agitated for 5 minutes to completely deaerate the same, after which 200 parts of shark liver oil were added slowly. The stirring was continued for 30 minutes. 20 parts of filter aid (such as that obtainable commercially under the trade name "High Flo") were added and the mass filtered. The residue was washed 5 times with 10-part portions of ethylene dichloride. The filtrate and washings were combined and the solvent removed by vacuum distillation in the presence of nitrogen gas. The resultant oil was treated by the process of Example I, using the oil in place of the crude shark liver oil employed therein. The resulting product was bland tasting and had no objectionable odor.

*Example IV*

200 parts of crude shark liver oil were admixed with 10 parts of clover honey and the mixture heated to 150° C. and maintained at this temperature for 10 minutes in a nitrogen atmosphere and under 10 mm. pressure. At the end of this time, the mass was allowed to cool and thereafter treated according to the process of Example I, using the same in place of the crude shark liver oil in said example. The product was devoid of fishy, bitter or other disagreeable tastes and odors.

While the foregoing specific examples are directed to the preparation of vitamin concentrates substantially devoid of fatty material, it is to be understood that high potency oils may also be produced whereby the high vitamin end-product will contain a portion of the original triglycerides. Moreover, it is not necessary according to this invention that saponification, whether complete or partial, be carried out in the presence of an organic solvent. As aforementioned the salient feature of the invention resides in the step of saponifying fatty materials in the presence of a fixative material of the type herein disclosed.

It will be evident from the above description that this invention provides a new and effective method of preparing substantially odorless and tasteless vitamin-containing materials from fat-soluble vitamin-containing materials having objectionable tastes and odors. My invention will, therefore, be of great interest to those engaged in the preparation of vitamin compositions, especially for human and animal consumption. Furthermore, while my invention is primarily directed to the treatment of fat-soluble vitamin materials, it is also applicable to the refining of any edible oil or fat having an objectionable taste and odor.

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention what I claim as new and desire to secure by Letters Patent is:

1. In a process of saponifying a fat-soluble vitamin-containing fatty material, the improvement which comprises saponifying the fatty material in the presence of a fixative material selected from the group consisting of sugars, sugar derivatives and edible gums.

2. In a process of treating a fat-soluble vitamin-containing oil, the improvement which comprises saponifying the oil in the presence of molasses.

3. In a process of treating fat-soluble vitamin-containing oil, the improvement which comprises saponifying the oil in the presence of a sugar.

4. In a process of treating fish liver oil, the improvement which comprises saponifying the oil in the presence of molasses.

5. A process of treating fish liver oil, which comprises partially saponifying the oil in the presence of a fixative material selected from the group consisting of sugars, sugar derivatives and edible gums, and separating the vitamin-enriched fraction from the resulting soap and fixative material by solvent extraction.

6. A process of treating fish liver oil, which comprises partially saponifying the oil in the presence of a sugar, and separating the vitamin enriched fraction from the resulting soap and sugar by solvent extraction.

7. A process of treating fish liver oil, which comprises substantially completely saponifying the oil in the presence of a fixative material selected from the group consisting of sugars, sugar derivatives and edible gums, and separating the unsaponifiable fraction from the resulting soap and fixative material by solvent extraction.

8. A process of treating fish liver oil, which comprises substantially completely saponifying the oil in the presence of a sugar, and separating the unsaponifiable fraction from the resulting soap and sugar by solvent extraction.

9. A process of treating fish liver oil, which comprises substantially completely saponifying the oil in the presence of molasses, and separating the unsaponifiable fraction from the resulting soap and molasses by solvent extraction.

10. A process of treating fish liver oil, which comprises saponifying the oil in the presence of honey, and separating the unsaponifiable fraction from the resulting soap and honey by solvent extraction.

11. A process of treating fish liver oil, which comprises partially saponifying the oil in the presence of molasses, and separating the unsaponified fraction from the resulting soap and molasses by solvent extraction.

LORAN O. BUXTON.